United States Patent
Ghosh et al.

[11] Patent Number: 5,840,140
[45] Date of Patent: Nov. 24, 1998

[54] METHOD FOR MAKING A MICROCERAMIC OPTICAL SHUTTER

[75] Inventors: Syamal K. Ghosh; Dilip K. Chatterjee, both of Rochester; Edward P. Furlani, Lancaster, all of N.Y.

[73] Assignee: Eastman Kodak Company, Rochester, N.Y.

[21] Appl. No.: 798,694

[22] Filed: Feb. 12, 1997

[51] Int. Cl.$^6$ .............................. B32B 31/26; G02B 26/02
[52] U.S. Cl. ..................... 156/89.28; 156/87; 156/89.16; 156/89.17; 156/89.18; 156/155; 156/168; 264/610; 359/236; 359/280
[58] Field of Search ................................ 156/87, 89, 155, 156/168, 89.11, 89.12, 89.17, 89.28, 89.18, 89.16; 264/610, 611; 396/463, 464; 359/230, 236, 280

[56] References Cited

U.S. PATENT DOCUMENTS

5,683,649  11/1997  Chatterjee et al. .
5,708,893  1/1998  Furlani et al. .......................... 396/464
5,739,942  4/1998  Furlani et al. .......................... 359/230

*Primary Examiner*—Curtis Mayes
*Attorney, Agent, or Firm*—Raymond L. Owens

[57] ABSTRACT

A method of making a microceramic optical shutter includes forming a sacrificial stator member and inserting the sacrificial stator member into the bottom ceramic portion in the green state, a top ceramic portion is sintered into the bottom portion to form a unitary ceramic body structure. The sacrificial stator member is formed with a sacrificial fiber wound in a helical fashion which is removed by etching. After etching ferromagnetic material is filled into the cavity to provide a helical coil.

4 Claims, 6 Drawing Sheets

METHOD FOR MAKING A MICROCERAMIC OPTICAL SHUTTER

CROSS REFERENCE TO RELATED APPLICATION

Reference is made to commonly assigned and concurrently filed U.S. patent application Ser. No. 08/798,080 entitled "Microceramic Optical Shutter" by Furlani et al, now U.S. Pat. No. 5,739,942, the teachings of which are incorporated herein.

FIELD OF THE INVENTION

The present invention relates to optical shutters which can be used as shutters for light exposure applications.

BACKGROUND OF THE INVENTION

Electromechanical shutters are well known in the art and have been used in a number of applications, for example, in which light exposes a photosensitive surface. It is, of course, highly advantageous to miniaturize such shutters. Conventional electromechanical shutters are typically greater that 1 cubic centimeter in volume. The materials and methods for the fabrication of these devices are inadequate for the fabrication of microelectromechanical shutters which are less than 1 cubic centimeter in volume.

SUMMARY OF THE INVENTION

It is an object of the present invention to provide miniaturized shutters which are less than 1 cubic centimeter in volume.

This object is achieved in a A method of making a microceramic optical shutter comprising:

(a) forming a sacrificial stator member comprising a sacrificial stator core with a tape cast ceramic material wrapped around its central portion, and a sacrificial fiber wound in a helical fashion on the tape cast ceramic material;

(b) forming a micromolded bottom ceramic portion in the green state having a cavity for receiving the sacrificial stator member, and inserting the sacrificial stator member in such cavity;

(c) forming a micromolded top ceramic portion in the green state having a first pair of through holes for receiving the ends of the sacrificial fiber, and a second pair of through holes disposed in relationship to the sacrificial stator member;

(d) assembling the top and bottom micromolded ceramic portions and sintering such assembled structure to form a unitary ceramic body;

(e) etching through the first pair of through holes the sacrificial fiber to thereby provide an embedded helical coil receiving cavity and etching through the second pair of through holes the sacrificial stator member to provide a second cavity for receiving the ferromagnetic stator member;

(f) filling the helical coil receiving cavity with an electrically conductive metal and filling the second cavity with soft molten ferromagnetic material;

(g) providing a light aperture through the unitary ceramic body and a recess in the unitary ceramic body; and (h) mounting a shutter drive mechanism in the recess and in operative relationship to the stator and having a shutter blade which is movable between light blocking and light passing positions relative to the light aperture so that when a drive voltage is applied to the coil structure, in a first direction a field is created through the stator which provides a driving force to the shutter drive mechanism to move it to the light passing position and when the drive voltage is applied in the opposite direction to the coil structure the shutter drive mechanism moves the shutter from the light passing position to the light blocking position.

ADVANTAGES

It is a feature of the present invention that miniaturized shutters can be fabricated using micromolded ceramic technology.

Microceramic shutters have a number of advantages; they can withstand harsh corrosive or high temperature environments. Another feature of this invention is that by using micromolded ceramic technology, shutters can be made in high volume with high yields at reduced cost.

BRIEF DESCRIPTION OF THE DRAWINGS

FIG. 5c is a cross-sectional view of the insert member taken along the lines A—A of FIG. 5a;

DETAILED DESCRIPTION OF THE PREFERRED EMBODIMENTS

Figure 1:
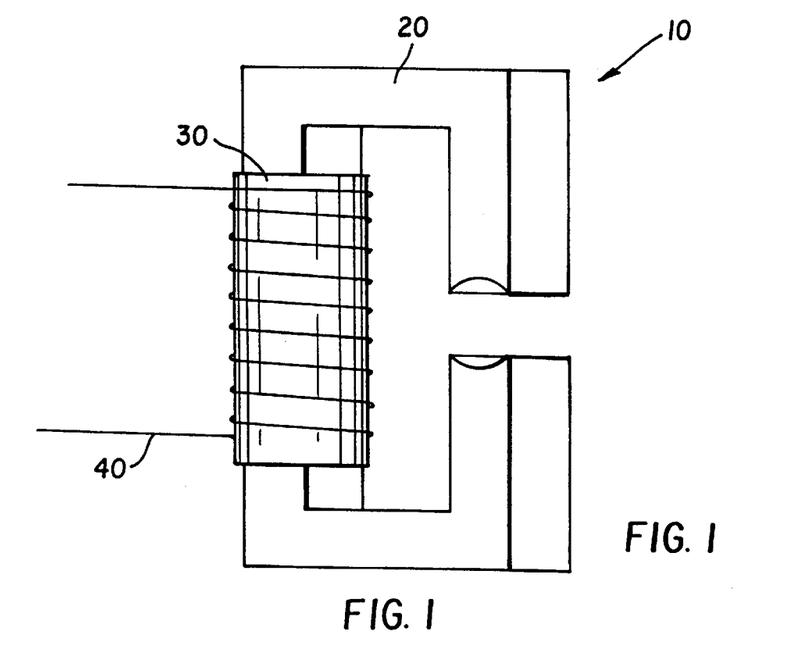
FIG. 1 is a perspective of a sacrificial stator member of a shutter in accordance with the present invention.

Referring to FIG. 1, a perspective is shown of a sacrificial stator member 10 comprising a sacrificial stator core 20 with a tape cast green ceramic sheet material 30 wrapped around its central portion, and a sacrificial fiber 40 wound in a helical fashion on the tape cast ceramic 30. The sacrificial stator core 20 has a cross-sectional dimension of 0.25 mm or less (i.e., 0.5 mm on a side), and the sacrificial fiber 30 is on the order of 100 microns in diameter or less. The sacrificial fiber 30 is made from refractory materials such as tungsten (W), molybdemum (Mo), or Tantalum (Ta). The sacrificial stator core 20 is made from organic polyvinyl alcohol or polyvinyl acetate. The sacrificial stator core 20 can be designed and fabricated using a stenolithography technique which is known in the art.

Figure 2:
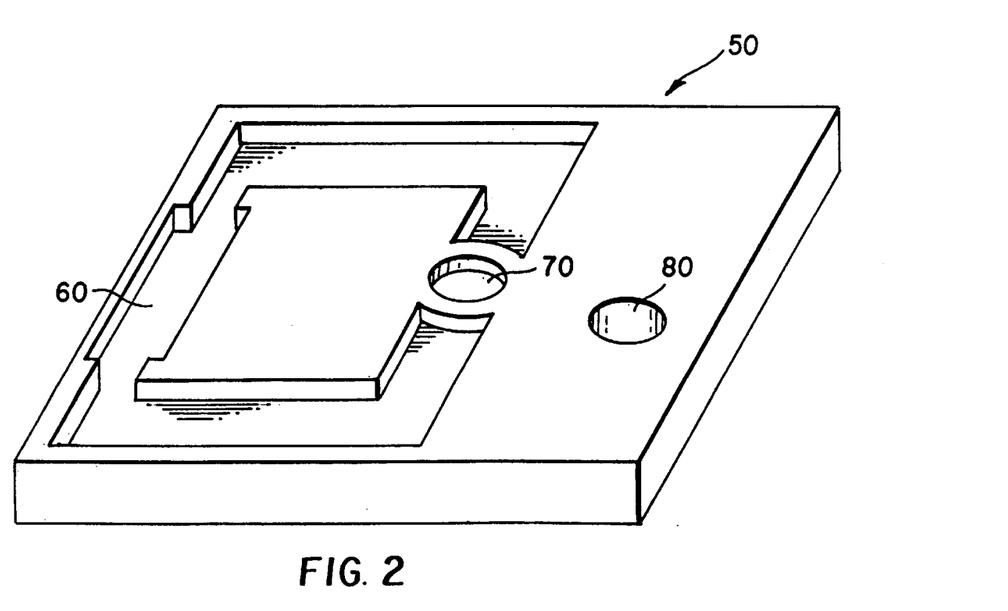
FIG. 2 is a perspective of a micromolded ceramic block which forms the base element of a microceramic shutter in accordance with the present invention.

Referring to FIG. 2 a perspective is illustrated of a micromolded ceramic block 50 in the green state, with a recessed cavity 60 which is formed to receive the stator member 10. The micromolded ceramic block 50 has a recess 70 and a through-hole 80. In this context, the green state refers to a compacted ceramic body comprising ceramic powder with (or without) organic binders. The ceramic powder could be dry or in a state of slurry mixed with organic binders. The ceramic powder should preferably be selected from the following materials: alumina, titania, zirconia, or alumina-zirconia composites.

Figure 3:
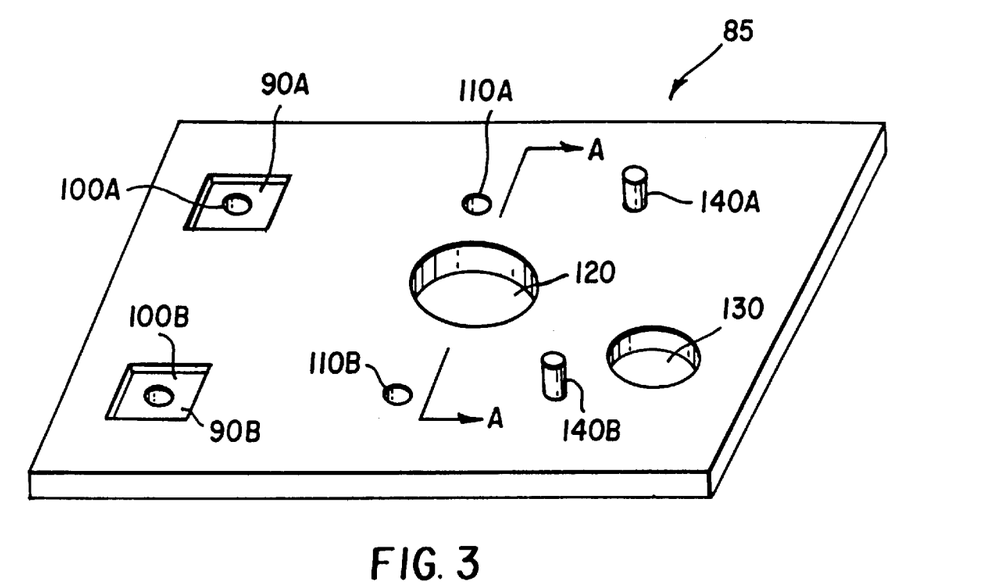
FIG. 3 is a perspective of a micromolded ceramic top portion which when combined with the structure of FIG. 2 forms the body of the structure.

Referring to FIG. 3 a perspective is illustrated of a micromolded ceramic top portion 85 in the green state. The top portion 85 has recesses 90A and 90B which have through holes 100A and 100B, respectively, as part of their surface features. There are additional through-holes 110A and 110B, 120 and 130. The holes 100A and 100B are for receiving the ends of the sacrificial fiber 40, and the holes 100A and 110B will be disposed in relationship to the sacrificial stator core 20 as will be described. In addition to these features there are raised stop structures 140A and 140B.

Figure 4A:
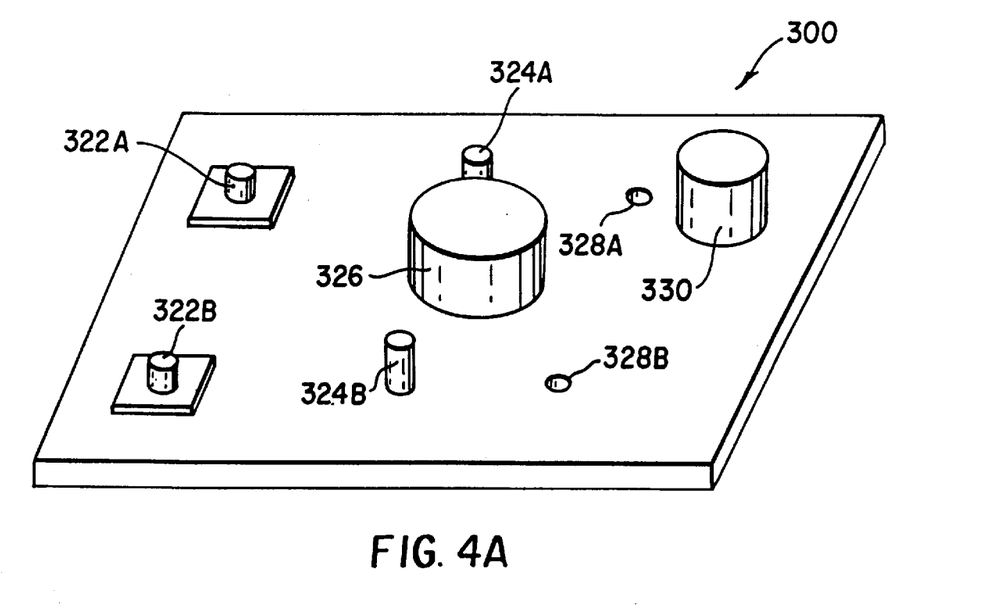
FIGS. 4a and 4b show plan and end views respectively of various sections of a mold for making the micromolded ceramic top portion of FIG. 3.
Figure 4B:
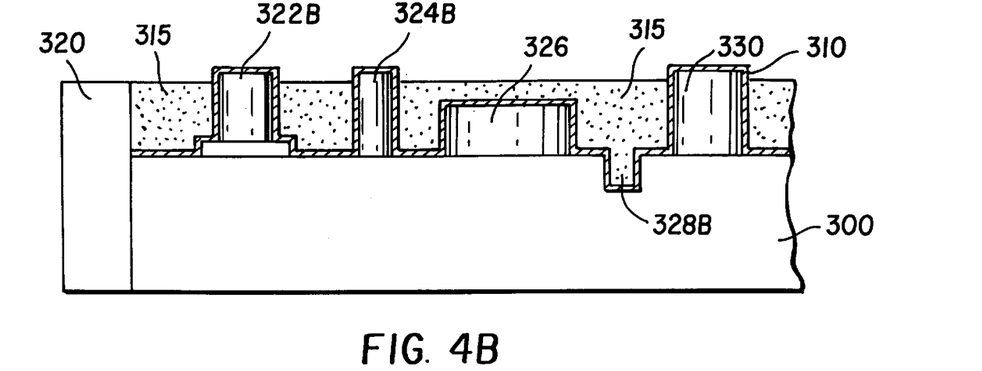

Referring to FIG. 4a, a perspective of a mold 300 for gel casting ceramic slurry to form top portion 85 is illustrated (see FIG. 3). The mold 300 may be constructed by dry (ion) etching sapphire (alumina single crystal), quartz ($SiO_2$), Na—Al-silicate or similar ion etchable glasses. The conventional ion etching processes of the above mentioned materials are well known in the art. The mold structures 322A and 322B form the through-holes 100A and 100B, respectively, and the mold structures 324A and 324B form the through-holes 110A and 110B, respectively. The mold structure 326 forms the through-hole 120, and the mold structures 328A and 328B form the stop structures 140A and 140B, respectively. The mold structure 330 forms the through-hole 130. Once the mold has been fabricated, it is coated with a thin release layer 310 (FIG. 4b) comprising Cr or hard carbon or diamond-like carbon. The release layer 310 is deposited by a physical vapor deposition process such as sputtering or ion plating or plasma assisted chemical vapor deposition (PACVD). The thickness of the release layer 310 ranges from 300 to 3000 Å. Referring now to FIG. 4b, the casting process in side view is illustrated. A ceramic slurry or a sol-gel 315 is poured over the mold 300 which is surrounded by a support structure 320. An oxide based ceramic slurry (alumina, zirconia, magnesia) containing organic binders or ceramic composites mixed with organic binders can also be used. The organic binders are either water soluble or soluble in organic solvents. The ceramic slurry (gel) or equivalent ceramic based sol-gel or glass based sol-gels are cast and allowed to dry thereby producing a molded part in the form top portion 85 (see FIG. 3). The molded part is easily removed due to the presence of release layer 310.

Figure 5A:
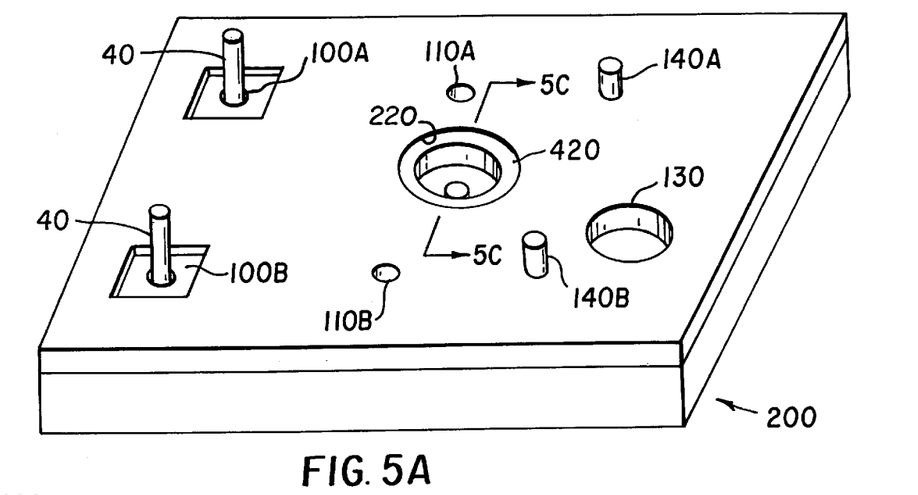
FIG. 5a is a perspective of an assembled shutter mechanism prior to sintering.
Figure 5B:
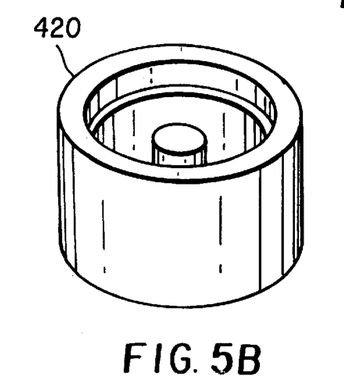
FIG. 5b is a perspective of an insert member which when inserted into the assembled shutter mechanism of FIG. 5a provides a bearing surface.
Figure 5C:
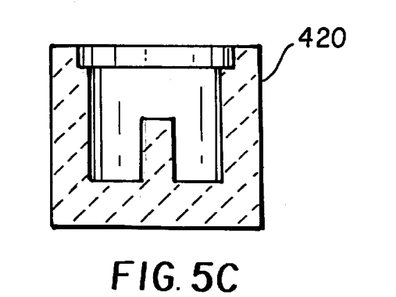

Referring to FIG. 5a, a perspectives is illustrated of the assembled unitary ceramic body 200 in which the top portion 85 is placed on ceramic block 50. The end portions of sacrificial fiber 40 are drawn through holes 100A and 100B. FIG. 5b, illustrates a green ceramic insert 420 comprising $MoSi_2$ or $ZrB_2$. The insert 420 is placed in recess 220 in unitary ceramic body 200 which is formed by the mating of recess 70 in ceramic block 50 with through-hole 120 in top portion 85 shown in FIGS. 2 and 3, respectively. FIG. 5c illustrates a cross-sectional view of the insert sectioned taken along the lines A—A in FIG. 5A.

Once assembled, the unitary ceramic body 200 is sintered in vacuum or in a controlled oxygen-free atmosphere at about 1300° to 1600° C., to form a unitary ceramic body. During this sintering step, the sacrificial stator core 20 burns away and sacrificial fiber 40 is etched away after sintering using Ammonium Hydroxide $NH_4OH$ or Hydrocloric acid leaving embedded cavities in their place. More particularly by etching through the pair of through holes 100A and 100B, the sacrificial fiber is removed to thereby providing embedded helical coil receiving cavities. The through holes 110A and 110B act as vents for the sacrificial stator core 20. During sintering, the sacrificial stator core burns away.

Figure 6:
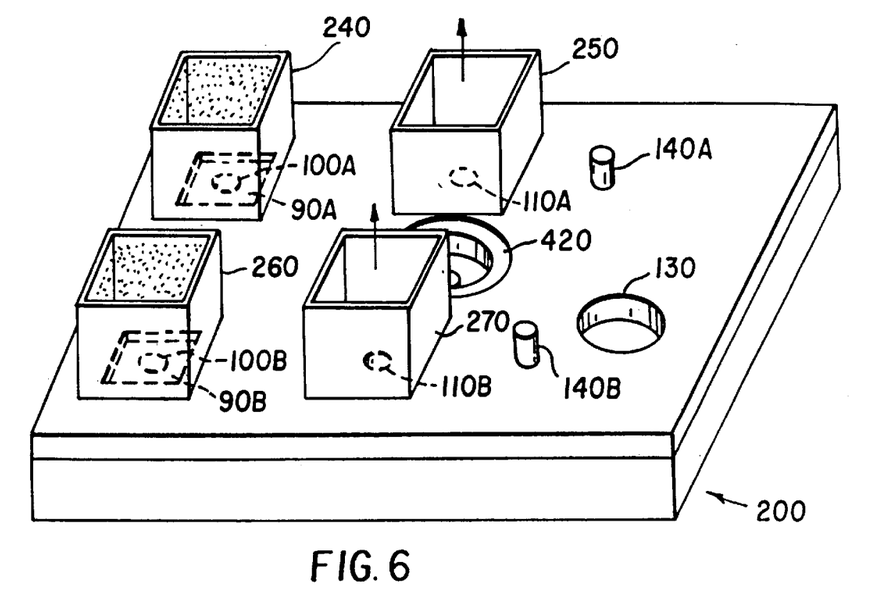
FIG. 6 is a perspective of the structure in FIG. 5a is shown after a sintering and etching process with apparatus mounted for filling internal cavities that result from etching away embedded sacrificial members.

Referring to FIG. 6, a perspective is shown of the unitary ceramic body 200 after a sintering and etching process with apparatus mounted for filling internal cavities that result from etching away and burning out embedded sacrificial members. Specifically, nonporous containment structures (dams) 240 and 250 are mounted around rectangular recess 90A and through hole 110A, respectively. Vacuum chamber structures 260 and 270 are mounted around rectangular recess 90B and through hole 110B, respectively. Containment structure 240 is filled with a molten pool of conductive metal alloy such as Au, Ag, Ag—Cu, or Cu—Sn or alternatively a thin film conductive paste. A vacuum is applied to vacuum chamber structures 260 so as to the draw conductive metal alloy into the embedded etched path connecting through holes 100A and 100B thereby forming a helical conductive coil structure in the form of wound sacrificial fiber 40 (see FIG. 1) within unitary ceramic body 200 with terminal ends in the form of conductive pads 95A and 95B on the surface of unitary ceramic body 200 (see FIG. 7). Containment structure 250 is filled with a molten pool of soft-magnetic material such as permalloy, supermalloy, sendust, iron, nickel, nickel-iron. A vacuum is applied to vacuum chamber structures 270 so as to draw soft-magnetic alloy into the embedded stator cavity connecting through holes 110A and 110B thereby forming a soft-magnetic stator core in the form of sacrificial stator core 20 (FIG. 1) within unitary ceramic body 200.

Figure 7:
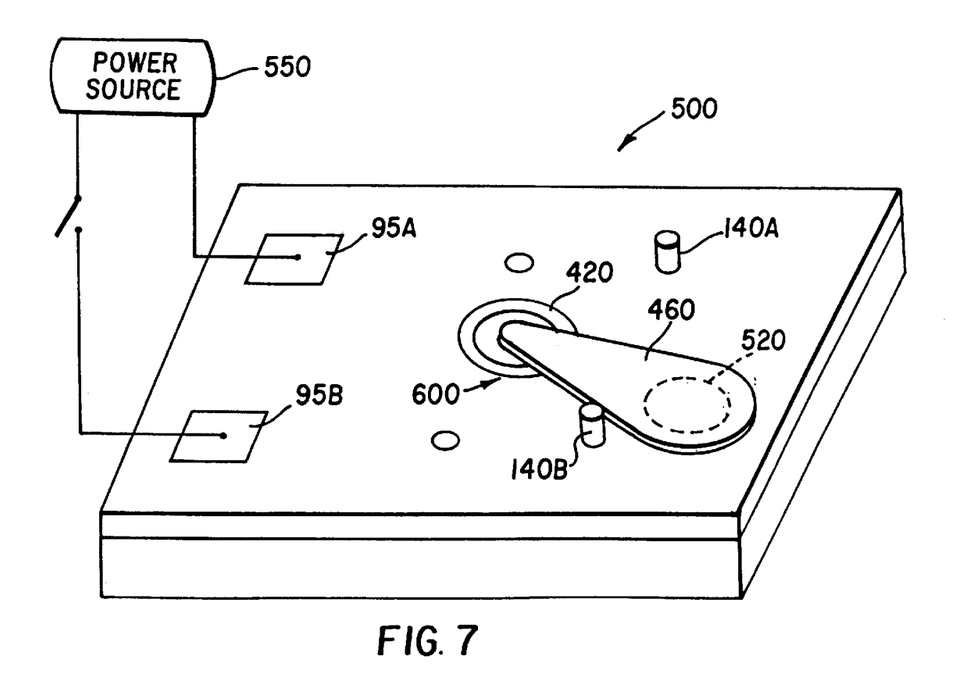
FIG. 7 is a perspective of the assembled actuator with attached power source.
Figures 8A, 8B:
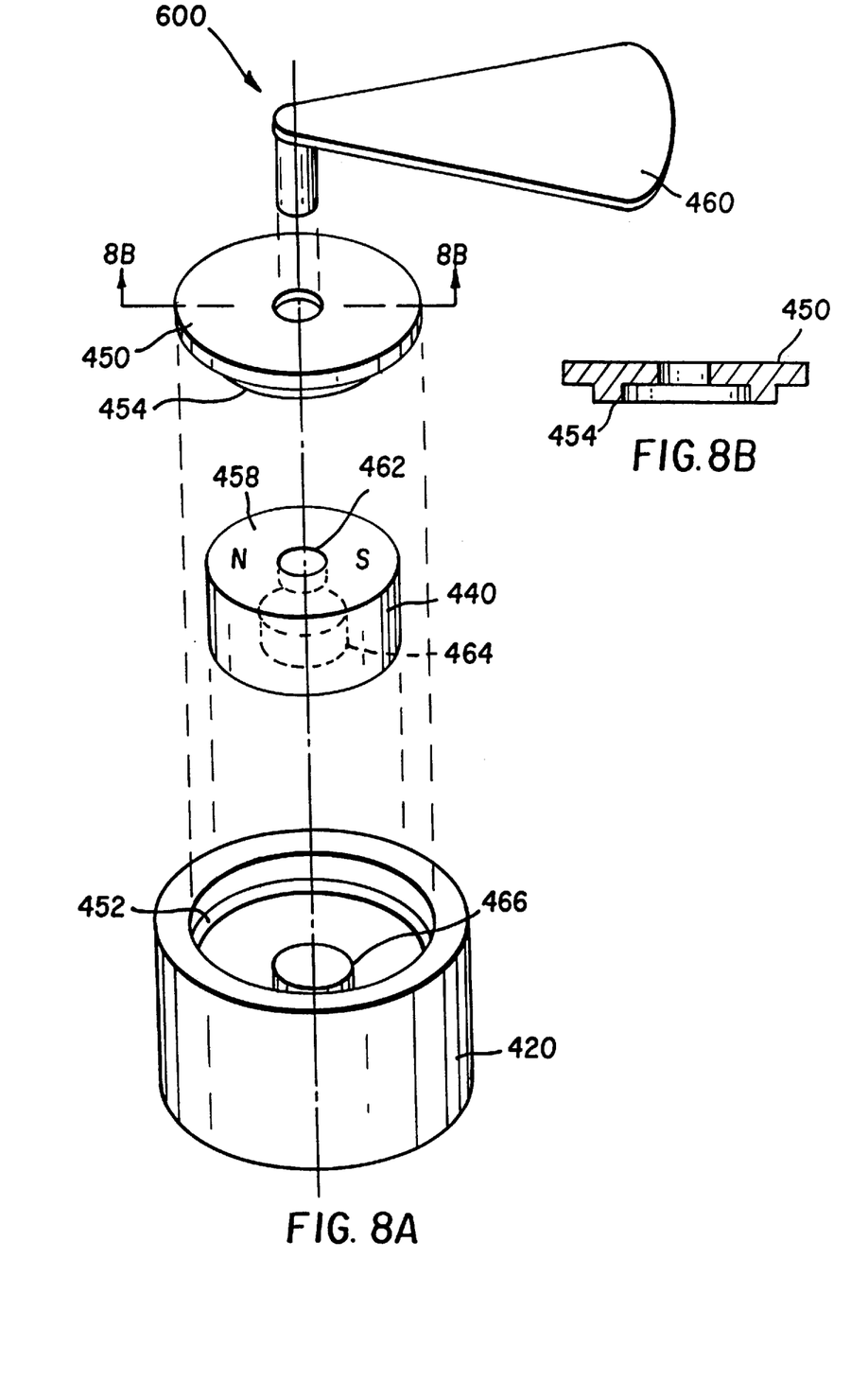
FIG. 8a is an exploded view of the shutter assembly.
FIG. 8b is a cross-sectional view of a top plug member of the shutter assembly of FIG. 8a, taken along lines B—B.

Referring to FIG. 7 a perspective is shown of the assembled actuator 500 with shutter aperture 520, power source 550, and shutter assembly 600 (see FIG. 8). Shutter aperture 520 is formed by the mating of through-hole 80 in ceramic block 50 and through-hole 130 in top portion 85 shown in FIGS. 2 and 3, respectively. Power source 550 is connected to conductive pads 95A and 95B so as to provide current to actuator 500 for causing rotation of shutter blade 460.

Referring to FIG. 8, an exploded view of the shutter assembly 600 is shown depicting how its components are assembled as a unit in the ceramic body 200. The shutter assembly 600 comprises a low friction ceramic insert 420, a rotatable micromagnet 440, a top plug 450, and a shutter blade 460. The ceramic insert 420, which is as an integral part of the ceramic body 200 (see FIG. 5a), provides a bearing surface for rotation of the micromagnet 440 and is made using low friction ceramic material such as $MoSi_2$ or $ZrB_2$. The micromagnet 440 is made of a hard ferromagnetic material, such as neodynium-iron-boron NdFeB. The top plug 450 is shrunk fit into insert 420 and rests on ledge 452 of insert 420. The surface 454 of plug 450 functions as a low friction bearing for the top surface 458 of rotatable micromagnet 440. The top plug 450 is made using low friction ceramic material such as $MoSi_2$ or $ZrB_2$. The optical shutter 460 can be constructed using light metals such as Al or Mg or Al-alloys or alternatively opaque plastics such as nylon or polyethylene or PVC. The shutter 460 is press fit into the receiving hole 462 located at the top of the micromagnet. A recess 464 enables the micromagnet to reside and move freely on the shaft 466 located in the ceramic insert 420. It is instructive to note that the ceramic body 200 (see FIG. 5*a*) is sintered in absence of air to keep the silicide or boride in insert 420 from oxidizing.

Figure 9A:
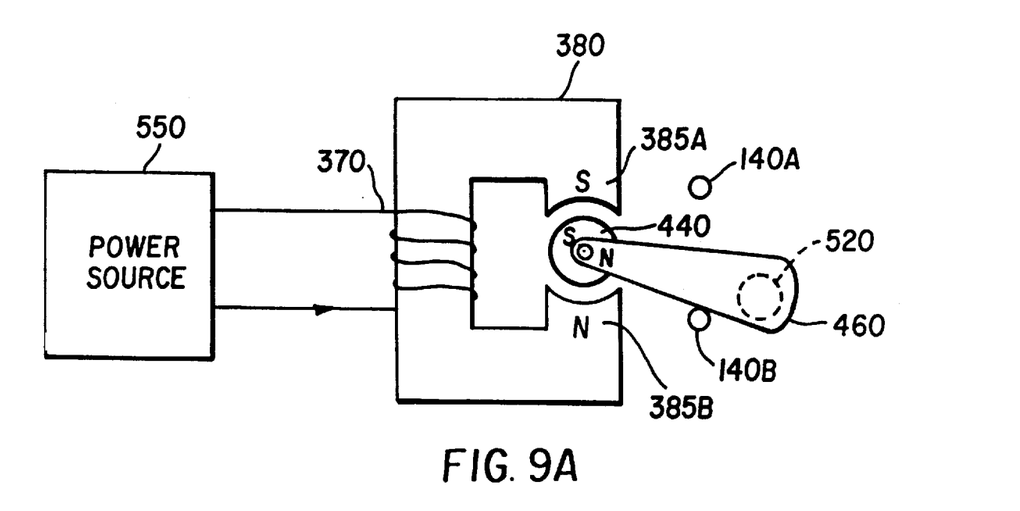
FIG. 9a and 9b are schematic diagrams depicting of the operation of the shutter.
Figure 9B:
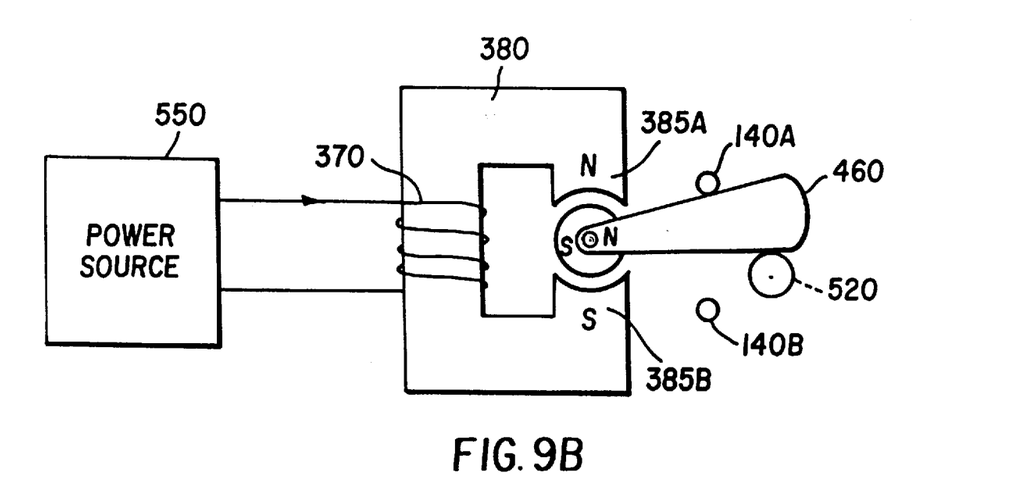

Referring to FIGS. 9*a* and 9*b*, schematic diagrams are shown depicting the operation of actuator 500. In FIG. 9*a*, shutter blade 460, which is rigidly attached to rotatable micromagnet 440, is in a first, light blocking position in which shutter blade 460 blocks light from passing through aperture 520. The shutter blade 460 is held against stop structure 140B because of the torque imparted to micromagnet 440 by the soft-magnetic core 380 as is well known. To unblock (uncover) aperture 520, a power source 550 causes current to flow through coil 370 in a first direction which results in a magnetic field being applied to soft-magnetic core 380 thereby forming a south pole at pole tip 385A and north pole at pole tip 385B. These induced poles impart a torque to micromagnet 440 causing it to rotate counterclockwise with its north pole attracted to induced south pole at pole tip 385A and with its south pole attracted to induced north pole at pole tip 385B. The shutter blade 460 impacts stop structure 140A (see FIG. 9*b*). In FIG. 9*b* the shutter blade 460 is shown in a second, light passing position, in which aperture 520 is uncovered for allowing light to pass therethrough. Micromagnet 440 is held in this position with attached shutter blade 460 held against stop structure 140A even when no current passes through coil 370 because of the torque imparted to micromagnet 440 by the soft-magnetic core 380 as is well known. To return the shutter blade to its first, light blocking position the power source 550 causes current to flow through coil 370 in a second direction which results in a magnetic field being applied to soft-magnetic core 380 thereby forming a north pole at pole tip 385A, and a south pole at pole tip 385B. These induced poles impart a torque to micromagnet 440 causing it to rotate clockwise with its north pole attracted to induced south pole at pole tip 385B and with its south pole attracted to induced north pole at pole tip 385A. The micromagnet 440 will come to rest when attached shutter blade 460 impacts stop structure 140B as shown in FIG. 9*a*.

The invention has been described in detail with particular reference to certain preferred embodiments thereof, but it will be understood that variations and modifications can be effected within the spirit and scope of the invention.

PARTS LIST

10 stator member
20 sacrificial stator core
30 tape cast ceramic
40 sacrificial fiber
50 ceramic block
60 cavity
70 recess
80 through-hole
85 top portion
90A rectangular recess
90B rectangular recess
95A conductive pad
95B conductive pad
100A through-hole
100B through-hole
110A through-hole
110B through-hole
120 through-hole
130 through-hole
140A stop structure
140B stop structure
200 unitary ceramic body
220 recess
240 nonporous containment structure
250 nonporous containment structure
260 vacuum chamber structure
270 vacuum chamber structure
300 micromold
310 release layer
315 slurry
320 support structure
322A mold structure
322B mold structure
324A mold structure
324B mold structure
326 mold structure
328A mold structure
328B mold structure
330 mold structure
370 coil
380 soft-magnetic core
385A pole tip
385B pole tip
420 insert
440 micromagnet
450 top plug
452 ledge
454 surface
458 surface
460 shutter blade
462 hole
464 recess
466 shaft
500 assembled actuator
520 aperture
550 power source
520 shutter aperture
600 shutter assembly

We claim:

1. A method of making a microceramic optical shutter comprising:

(a) forming a sacrificial stator member comprising a sacrificial stator core with a tape cast ceramic material wrapped around its central portion, and a sacrificial fiber wound in a helical fashion on the tape cast ceramic material;

(b) forming a micromolded bottom ceramic portion in the green state having a cavity for receiving the sacrificial stator member, and inserting the sacrificial stator member in such cavity and providing an opening in the bottom ceramic portion for a light aperture;

(c) forming a micromolded top ceramic portion in the green state having a first pair of through holes for receiving the ends of the sacrificial fiber and providing an opening in the top ceramic portion for a light aperture, and a second pair of through holes disposed in relationship to the sacrificial stator member;

(d) assembling the top and bottom micromolded ceramic portions and sintering such assembled structure to form a unitary ceramic body with a light aperture and to burn out the sacrificial stator core through the second pair of through holes to provide a second cavity for receiving a ferromagnetic stator member;

(e) etching through the first pair of through holes the sacrificial fiber to thereby provide an embedded helical coil receiving cavity;

(f) filling the helical coil receiving cavity with an electrically conductive metal and filling the second cavity with soft molten ferromagnetic material to form the ferromagnetic stator member;

(g) providing a recess in the unitary ceramic body; and (h) mounting a shutter drive mechanism in the recess and in operative relationship to the stator and having a shutter blade which is movable between light blocking and light passing positions relative to the light aperture so that when a drive voltage is applied to the coil structure, in a first direction a field is created through the stator which provides a driving force to the shutter drive mechanism to move it to the light passing position and when the drive voltage is applied in the opposite direction to the coil structure the shutter drive mechanism moves the shutter from the light passing position to the light blocking position.

2. A method of making a microceramic optical shutter according to claim 1 wherein the shutter blade is made from light metals selected from the group consisting of Al, Mg, and Al-alloys or alternatively opaque plastics selected from the group consisting of nylon, polyethylene, and PVC.

3. The method of claim 1 wherein the ferromagnetic stator is formed from soft magnetic material selected from the group consisting of permalloy, supermalloy, sendust, iron, nickel, nickel-iron and alloys thereof.

4. The method of claim 1 wherein the helical coil is formed from conductive metal alloys selected from the group consisting of Au, Ag, Ag—Cu, and Cu—Sn or alternatively a thin film conductive paste.

* * * * *